United States Patent [19]

Szeto

[11] Patent Number: 4,573,140
[45] Date of Patent: Feb. 25, 1986

[54] METHOD OF AND APPARATUS FOR VOICE COMMUNICATION STORAGE AND FORWARDING WITH SIMULTANEOUS ACCESS TO MULTIPLE USERS

[75] Inventor: Charles Szeto, Medway, Mass.

[73] Assignee: Voicetek Corporation, Brighton, Mass.

[21] Appl. No.: 480,906

[22] Filed: Mar. 30, 1983

[51] Int. Cl.[4] .......................... G06F 3/00; G06F 13/00
[52] U.S. Cl. .................................................... 364/900
[58] Field of Search ... 364/200 MS File, 900 MS File; 179/2 EB, 18 B, 7.1 TP, 2 ED; 455/38

[56] References Cited

U.S. PATENT DOCUMENTS

| | | | |
|---|---|---|---|
| 4,060,848 | 11/1977 | Hyatt | 364/200 |
| 4,260,854 | 4/1981 | Kolodny et al. | 179/6.09 |
| 4,371,752 | 6/1983 | Matthews et al. | 179/7.1 TP |
| 4,468,813 | 8/1984 | Burke et al. | 172/2 EB X |
| 4,495,647 | 1/1985 | Burke et al. | 455/38 |

Primary Examiner—Harvey E. Springborn
Attorney, Agent, or Firm—Rines and Rines, Shapiro and Shapiro

[57] ABSTRACT

A technique for voice or other similar communication signal storage (such as recording) and forwarding (such as playback) enables simultaneous access to multiple users through use of first-in-first-out memories (FIFO), microprocessor-controlled to fill intermediate memory RAMs at irregular intervals and to transfer the contents thereof to main memory RAMs for ultimate segmented disc recording, with playback therefrom also microprocessor-controlled at irregular intervals to transfer back recorded data in block form through the main memory RAMs and appropriate intermediate memory RAMs and FIFO memories associated with an appropriate playback channel or user. The various data transfers are controlled to avoid delays in the played back messages, succeeding segments of data being transferred to intermediate memory RAMs by the time the transfer of the previous segment is complete, thereby insuring continuity of communication.

23 Claims, 8 Drawing Figures

METHOD OF AND APPARATUS FOR VOICE COMMUNICATION STORAGE AND FORWARDING WITH SIMULTANEOUS ACCESS TO MULTIPLE USERS

The present invention relates to voice communication storage and retrieval systems as of the type in which a centralized repository is employed to receive and store voice communication messages from multiple users and to be accessed for the retrieval or forwarding of the messages by telephone; the invention being more particularly concerned with the preferred employment of radio-actuated paging; and with permitting simultaneous access to a number of users placing and retrieving messages without subjecting them to delays.

It has been proposed to employ a plurality of magnetic tape recorders for receiving, serially recording and enabling accessing of messages, with complex and expensive multiplexing for achieving simultaneous communication for the above purposes, as described, for example, in U.S. Pat. No. 4,260,854. Such systems are, however, seriously limiting in application by virtue of the fact that recorded messages on tape cannot be accessed randomly and are really useful only when one associates one tape and one recording machine with one individual or one telephone. Further, the recording medium cannot be accessed simultaneously by more than one user; such simultaneous access being a particularly important attribute for a centralized system serving many users at a busy time of the day, and a feature attained by the present invention.

While other approaches have involved disc-based systems with complex storage techniques such as pairs of basic memory buffers for recording on one side while transferring data from the other, as in U.S. Pat. No. 4,371,752, such are limited either by inability to record conversations of random length (from seconds to hours) and/or by expensive construction—limitations overcome by the present invention through its economy of construction residing in the use of dynamically assigned blocks of memory under novel microprocessor control.

In accordance with the invention, it is now possible to create such a system at reasonable cost readily adaptable so that messages may be placed and retrieved by telephone for applications such as the following:

1. Centralized telephone answering capability for a large number of users, typically employees of an organization. The equipment is readily adaptable to allow messages to be forwarded to other system users than the user for whom the message was originally intended; such message forwarding being passive or forced. Thus messages may be left by anyone for subscribers to the system and may be retrieved by subscribers to the system at any convenient time. Such operation is sometimes described as "voice mail".
2. Telephone answering services can be automated using this approach.
3. Radio-actuated paging system can provide automatic recording of voice messages which can than be accessed by the individual pages (tone only) when such individual can reach a telephone.
4. Some specialized dictation systems such as those used to dictate medical test reports or the like can use the system; the information being accessed by listening to the voice recording as soon as the report is dictated, without waiting for the transcription.

An object of the invention, accordingly, is to provide a new and improved method of and apparatus for voice communication storage and forwarding that is not subject to the prior art limitations, above-mentioned and others, but that enables simultaneous access to multiple users with great flexibility of application and low cost.

A further object is to provide a novel message storing and retrieval technique of more broad utility, as well.

Other and further objects will be explained hereinafter and are more particularly delineated in the appended claims.

The method underlying the invention converts the electrical signal which is an analog of the sound pressure of the voice to a digital signal and stores the digital data on a magnetic disc (a Winchester or hard disc), accessable at random such that any communication can be rapidly located and played back. Further, as explained more fully hereinafter, because of the speed with which the data can be transferred to the disc and retrieved from the disc, a buffering system is provided which allows a number of users (up to 32 in the preferred embodiment) to use the same disc at the same time, each with the impression that the disc is totally at the user's disposal (i.e., simultaneous access).

In summary, from one of its important aspects, the invention embraces a method of message communication digitized storage (in recording mode) and forwarding (in playback mode) along a plurality of input/output channels with simultaneous access to multiple users with the aid of a plurality of line interface systems having series/parallel first-in-first-out memories (FIFO) and intermediate memory RAMS under first microprocessor control and with data transfer connection to main memory RAMS the contents of which are data transferable under second microprocessor control with memory discs, said method comprising, reading the message recording or playback status of each of the plurality of channels in order; if in a recording mode, determining the state of filling of the FIFO memories and, under the control of the first microprocessor, transferring the data in as many filled FIFO memories as exist at such time to the first available empty data block of the intermediate memory RAMS, and when such block is filled, transferring the data thereof to the main memory RAMS; if in a playback mode, determining the state of filling of the successive FIFO memories and transferring channel data blocks to fill empty FIFO memories with message data being played back; examining the recording or playback status of each input/output channel of the plurality of line interface systems under control of the second microprocessor; receiving commands identifying which channels are assigned for recording and which for playback; if a recording mode is assigned, and the said examining of said status has recognized such recording mode, determining whether data blocks from such channel still exist in the main memory and transferring such to the memory discs; if the recording mode is not recognized during such examining, communicating such status to the first microprocessor of the appropriate channel line interface system; if a playback mode is assigned, and the said examining of such status has recognized such playback mode, determining whether the channel is calling for more data, and if so, transferring data blocks of such channel from full main memory RAMS to intermediate memory RAMS and successive FIFO memories of the appropriate channel line interface system for playback; and, if the playback mode is not recognized during such examining, communicating an interrupt to the first microprocessor of the appropriate line interface system. Preferred and best mode embodiments and details of construction and operation are hereinafter presented.

The invention will now be described in connection with the accompanying drawings. FIG. 1 of which is a block diagram of a preferred embodiment of the invention illustrating data flow and control of data transfer for a voice or similar storage and forwarding system with simultaneous access for multiple users, shown operating in the recording mode;

Figure 1:
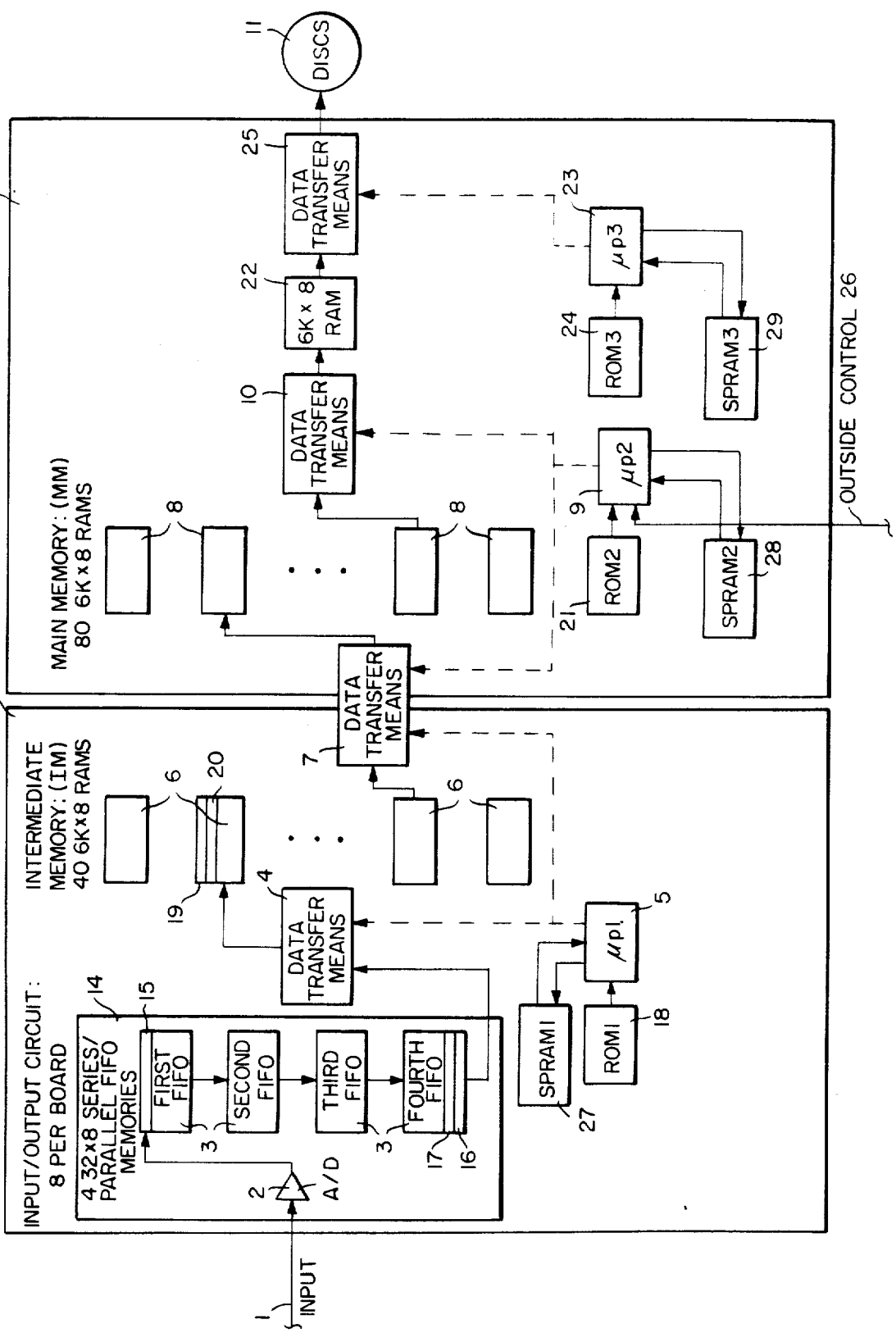

Referring to FIG. 1, an overview of a preferred embodiment is illustrated operating to record speech. Data flow paths are shown with solid arrowed lines and data transfer, with dashed lines. The system is provided with hard discs 11, a main processor board 13, and from one to four line interface boards 12. Each of the line interface boards contains eight independent input (or output) circuits 14 for audio signals, one of which is shown in FIG. 1.

In the recording mode, each input 1 is supplied with a voltage signal which is an analog of the voice sound pressure applied to the microphone of a telephone transmitter, for example. This signal is converted to a digital signal by an analog-to-digital converter (A/D) 2. The preferred A/D conversion scheme is the continously variable slope delta (CVSD) modulation method in which the continuously varying audio signal is converted into a bit stream. At the preferred sampling rate of say 20 kHz, the output of the A/D converter consists of a series of voltage pulses, spaced apart by 50 microseconds. Each pulse has a height of 5 V (a "one") or of 0 V (a "zero"), depending on whether the audio signal slope increased or decreased in amplitude within the previous 50 microseconds. This bit stream can be reconstituted into an analog voltage representation of the sound when applied to the input of an appropriate digital to analog (D/A) converter, later discussed.

The bit stream produced by the continously variable slope data modulation A/D converter is stored by a unique storage process in accordance with the invention. The first step in the storage process is the assembly of the bit stream into a series of, for example, 8-bit words. Each of the A/D converters of the line interface boards 12 is shown connected to a series of four 32×8 bit serial/parallel, first-in-first-out (FIFO) memories 3. As the bit stream begins to flow it fills the top register 15 of the first 32×8 FIFO memory. When the top register of the first FIFO is filled, the contents are shifted ("rippled") immediately to the bottom register of the fourth FIFO memory 16. The top register of the first FIFO memory is then free to assemble the next 8-bit word from the data stream. When the register is filled again, the resultant word is transferred to the second-from bottom register in the fourth FIFO memory 17. In the same way, the top register of the first FIFO memory keeps assembling the bit stream into 8 bit words which are passed down the FIFO memories to the last available unfilled register. At irregular intervals, under control of the program stored in read-only-memory ROM1 18 and scratchpad SPRAM1 27, microprocessor ($\mu$p1) 5 (e.g. a Zilog Z80A) determines the extent to which the FIFO memories 3 are filled. When at least the fourth of these FIFO memories is filled, $\mu$p1 causes the contents to be transferred to one of the forty 6k×8 (6,144×8) random access memories (RAM e.g. RAM TI 4164) 6 (the intermediate memory) using conventional data transfer means 4.

The choice of which of the RAMs 6 of intermediate memory (IM) is to be used is determined by $\mu$p1 according to the program hereinafter described. At the time a decision to transfer is made, the contents of all filled FIFO memories will be transferred; that is, the contents of the third (if it is full) and the contents of the second (if it is full), in addition to the contents of the fourth. The number of FIFO memories and the interval at which $\mu$p1 makes transfers does not allow the first FIFO memory to ever fill up, since if all the FIFO memories were to fill before a data transfer, data would be lost.

Once data from the filled FIFOs is transferred, the data in the partially filled FIFO remaining above the last FIFO to be emptied is rippled to the bottom of the fourth FIFO, and the process of accumulating data in the FIFO registers continues.

The transfer of data to one of the RAMs 6 is organized so that at the first data transfer, the contents of the bottom register 16 in the fourth FIFO memory is placed in the top register 19 of the RAM; the contents of the second-to-bottom register 17 of the fourth FIFO memory is placed in the second register 20 of the RAM/ and so forth. Thus the oldest data is at the bottom of the series of FIFO memories; and the oldest data is at the top of the RAM.

Once an assignment is made of the RAM 6 to be used for recording data from a particular audio input 1, $\mu$p1 keeps adding data from that source until the RAM is filled. Thus the RAM accumulates 6k×8 bits of data. Since the bits are produced one each 50 microseconds, each RAM will contain $6144 \times 8 \times 50 \times 10^{-6} = 2.5$ seconds of conversation. Subsequent 2.5 seconds of conversation are stored in other RAMs 6 as assigned by $\mu$p1 5.

The main processor board 13 provides an assembly point for data from the (up to) four line interface boards 12. As the intermediate memory RAMs 6 on the line interface boards fill up, the $\mu$p1 5 on each board queues the filled RAMs for transfer to the eighty 6k×8 RAMs 8 on the main processor board—the main memory M M. At irregular intervals, under control of the program stored in ROM2 21 and scratchpad SPRAM2 28, the further microprocessor $\mu$p2 9, shown on the main processor board 13, investigates the queues as reported by the $\mu$p1 5 of each of the line interface boards 12, and causes the contents of the RAM 6 at the head of a queue to be transferred to one of the RAMs 8 using conventional data transfer means 7. The choice of which of the RAMs 8 is to be used is determined by $\mu$p2 according to the later-described program. Once the contents of a RAM 6 are transferred, the RAM is returned to the pool of unused RAMs and may be reassigned by $\mu$p1 5.

As the RAMs 8 in the main processor board 13 fill up with data transferred from the audio interface boards 12, the microprocessor $\mu$p2 queues the filled RAMs 8 for data transfer to the discs 11. The contents of the RAM 8 at the head of the queue are transferred at irregular intervals by $\mu$p2 using data transfer means 10 to a single 6k × 8 RAM 22. The data is then transferred using data transfer means 25 from RAM 22 to a disc under the control of $\mu$p3 23. This microprocessor receives its instructions from ROM3 24 which contains the disc control program and from scratchpad SPRAM3 29. Once the contents of one of the main memory RAMs 8 are transferred to the disc system, the RAM is returned to the pool of unused RAMs and may be reassigned by $\mu$p2. System response is initiated by outside control 26 to $\mu$p2, illustrated at the bottom of FIG. 1.

Figure 2:
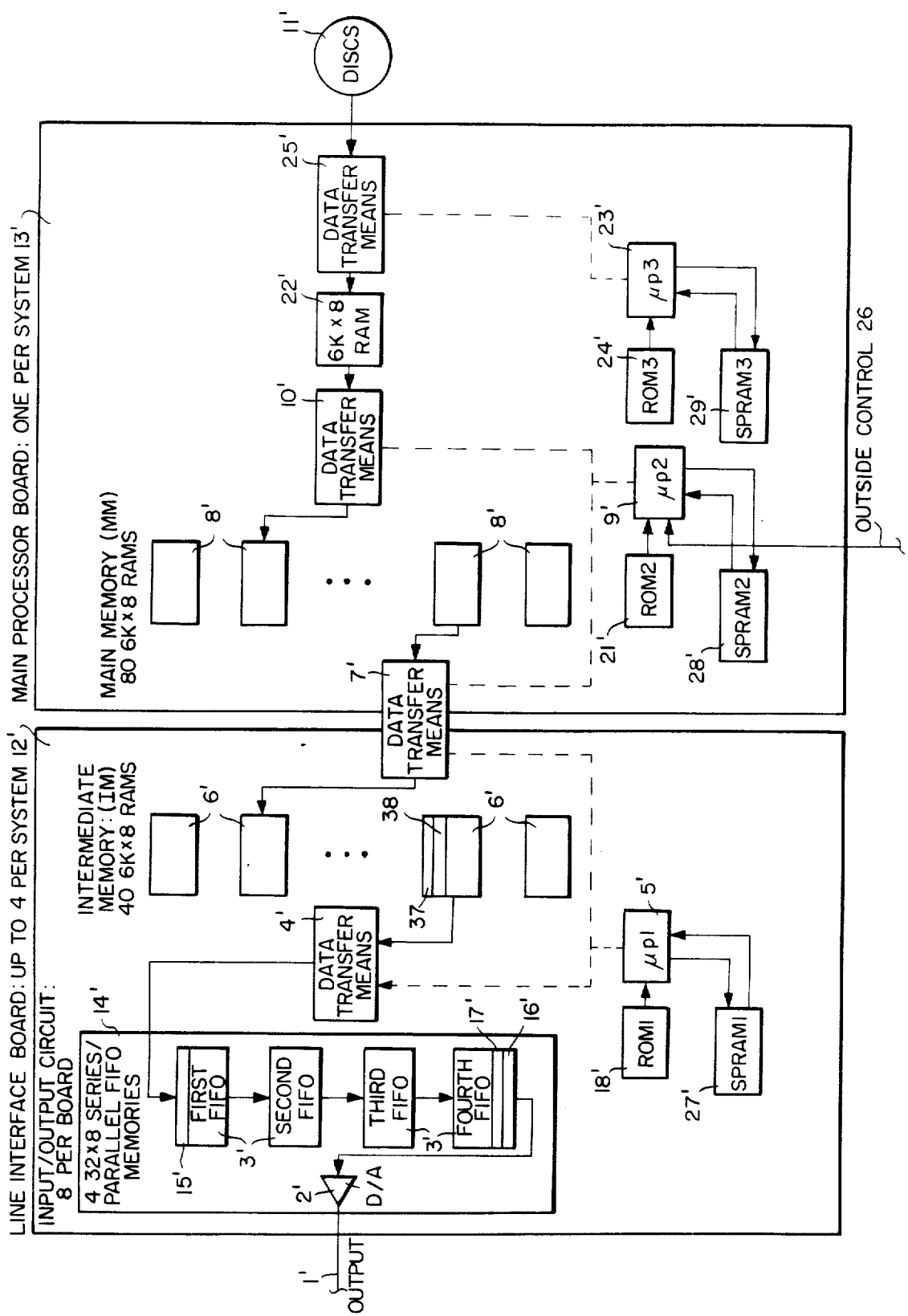
FIG. 2 is a similar diagram of the system in playback operation mode.

The operation of the system to play back speech is shown in FIG. 2, with components similar to those of FIG. 1 identified by prime notations.

In the playback mode, the system is instructed (by external means 26) to play back a message previously recorded. As indicated above, the message has been stored in 2.5 second segments on the discs 11'. The disc control system, under control of $\mu$p3 23' and the program stored in ROM3 24' and SPRAM 3 29', finds the segment of disc containing the first part of the 2.5 seconds of the message to be played back, and transfers the data to a 6k × 8 RAM 22' using data transfer means 25'. At irregular intervals, $\mu$p2 9' under control of ROM2 21' and SPRAM 28' assigns one of the available 6k × 8 RAMs 8' in the main memory to receive this data. The choice of RAM is made by the program later described. Data is then transferred to the RAM 8' from RAM 22' using the data transfer.

At irregular intervals, $\mu$p2 9' recognizes the existence of data in one of the RAMs 8' waiting transfer out. The $\mu$p2 9' recognizes which of the (up to) four line interface boards 12' contains the audio channel to which the playback is directed and transfers the data from the RAM 8' to one of the available RAMs 6' on the appropriate line interface board, using data transfer means 7'.

At irregular intervals, $\mu$p1 5', under control of the program stored in ROM1 18' and SPRAM1 27', recognizes the presence of the first (and subsequent) 2.5 second segments of speech in one of the RAMs 6' and which of the 8 input/output circuits 14' is to be used. Data has been stored in the RAMs such that the first (oldest) data to be played back is in the top register 37 of the RAM; using data transfer means 4', the 8-bit word in the top register 37 of the RAM is transferred to the top register 15' of the first of the four 8 × 32 FIFO memories 3'. As in the case of the record mode (FIG. 1), this word is automatically transferred to the bottom register 16' of the fourth FIFO memory. The next 8-bit word at register 38 in the RAM 6' is then transferred to the top register of the first FIFO memory; this word is then rippled down through the four FIFO memories. As this process continues, the contents of the bottom register of the fourth FIFO memory is removed bit-by-bit (oldest bit first) at the 20 kHz rate and fed to the input of a D/A converter 2'. As soon as the contents of the bottom register 16'have been transferred, the contents of the next higher register 17' are transferred to the bottom register 16', allowing the D/A conversion to continue at the same 20 kHz rate used to digitize the data.

System timing is so arranged that the series of four FIFO memories is never completely empty, thus avoiding delays in the played back conversations that are long enough to be perceived by the listener. Further, at least the next segment of 2.5 second conversation has been transferred to one of the RAMs 6' by the time the transfer of the previous segment is complete, ensuring continuity.

The D/A converter 2' reconstitutes the analog audio signal using the 20 kHz bit stream, employing the bits to control the slope of a continuously varying audio output signal; the process being opposite to that used to digitize the signal by the CVSD modulation method described in FIG. 1. The audio output appears on the output line so-labelled to the left in FIG. 2.

As with the operation in the record mode (FIG. 1), once the contents of RAM 6' or 8' have been transferred, the RAM is reassigned to a pool of available memories.

The process of recording described in connection with FIG. 1 and of playback described in connection with FIG. 2 may proceed at the same time with up to, for example, 32 channels operating simultaneously with any number n of channels devoted to recording and the balance of the channels (32-n) devoted to playback. The number of channels devoted to each service and the number idle at any moment is determined by the external calls for service at the moment. Once a channel which has been recording or playing back is released, it enters a pool of idle channels which can be reassigned for either recording or playback at the next call for service.

Channels may, if desired, be alternated between playback and record during the course of a conversation, allowing for the insertion of prerecorded prompts which help the user to operate the system. In a typical application, a 32-channel system permits reasonable service for several thousand subscribers.

It is now in order to examine in more detail the operation and programs used to control the system.

Figure 3:
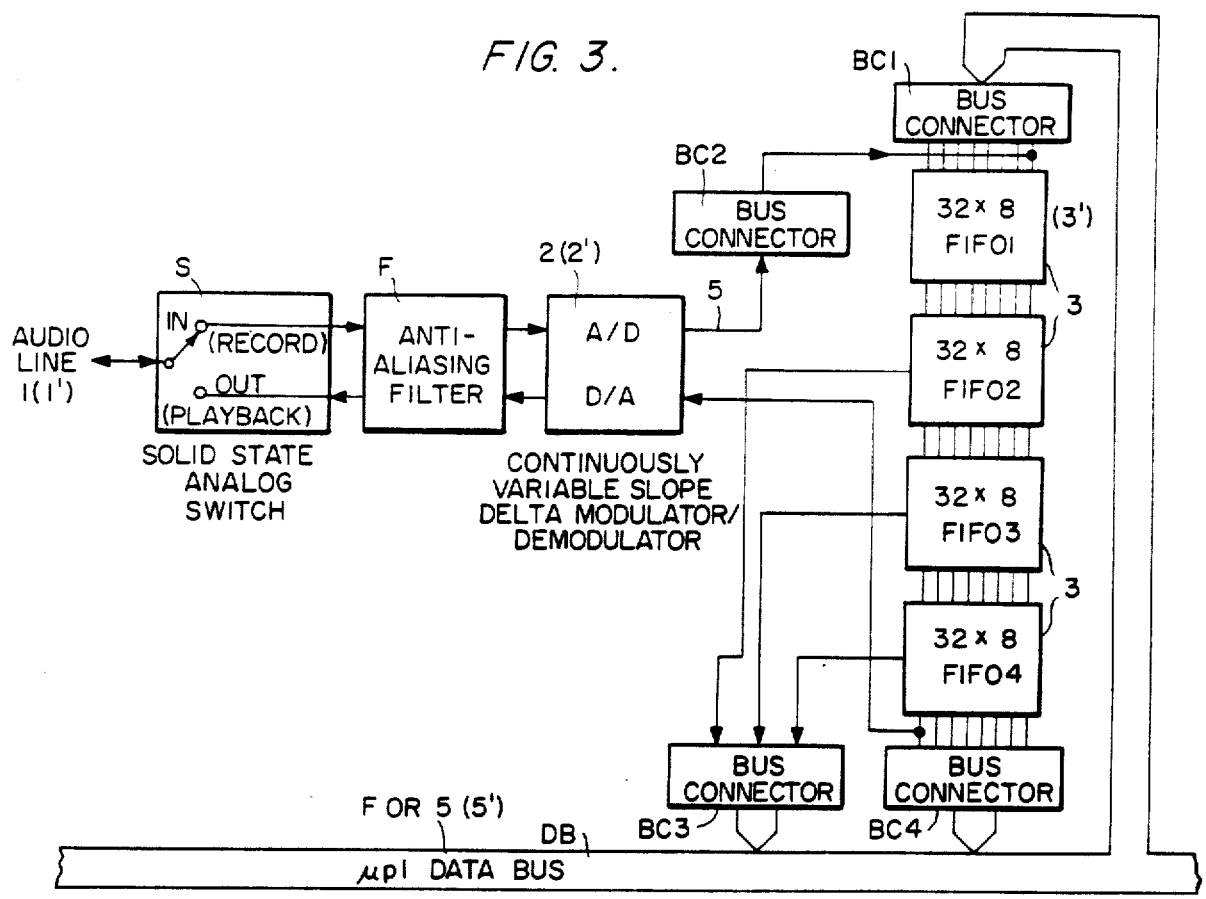
FIG. 3 is a more detailed diagram of the line interface input/output circuits employable in the systems of FIGS. 1 and 2.

The details of the input/output circuit, eight of which are included on each line interface board, are shown in FIG. 3. Clock, some circuitry, and control signals are not shown for clarity and in order not to detract from the essential features of novelty underlying the invention. The most important control signal (provided by $\mu$p1) defines whether the input/output circuit will operate in the record or in the playback mode.

When directed to operate in the record mode (FIG. 1), the audio line 1 is routed through a solid state analog switch S to the appropriate input of an antialiasing filter F. In this mode of operation, the filter serves as a bandpass filter with a pass band of from, say, 100 Hz to 3500 Hz, thereby reducing any extraneous noise components on the input signal. The signal is then passed to the A/D CVSD modulator 2 which provides a bit stream at the 20 kHz clock rate. A bus connector is shown at BC1 conected to the FIFO memories 3, being set to a high impedance state; while a further bus connector BC2, connected to the A/D modulator 2 and to the bus connector BC1, is set to pass the bit stream to the first series/parallel FIFO memory 3. The bit stream is formed into 8-bit words as described above, and the FIFO memories 3 are connected so as to ripple each word as it is formed to the bottom-most available register of the series of FIFO memories 3. When one of the FIFO memories is filled, a flag is set which may be passed to μp1 5 through bus connector BC3, upon command. When μp1 5 decides to transfer data, the lower bus connector BC4 connected to the lowermost or fourth FIFO 3, is enabled, placing the contents of the bottom register of FIFO memory onto the data bus DB. The μp1 5 continues to extract data, which keeps rippling to the bottom register until all the contents of the filled FIFO memories 3 are transferred.

When directed to operate in the playback mode, bus connector BC2 is set to the high impedance state and μp1 5 begins to place a series of 8-bit words on the data bus DB. As each word is placed in the top register of the FIFO memory through bus connector BC1, it ripples to the bottom register of FIFO memory 3 and is extracted, bit by bit, at the 20 kHz clock rate, bus connectors BC3 and BC4 being in the high impedance state. The bit stream is passed to the D/A converter of the modulator 2', the resultant audio signal is smoothed by the filter F, and is passed on to the audio line 1' by the switch S which has now been set to the "out" or playback position.

Figure 4:
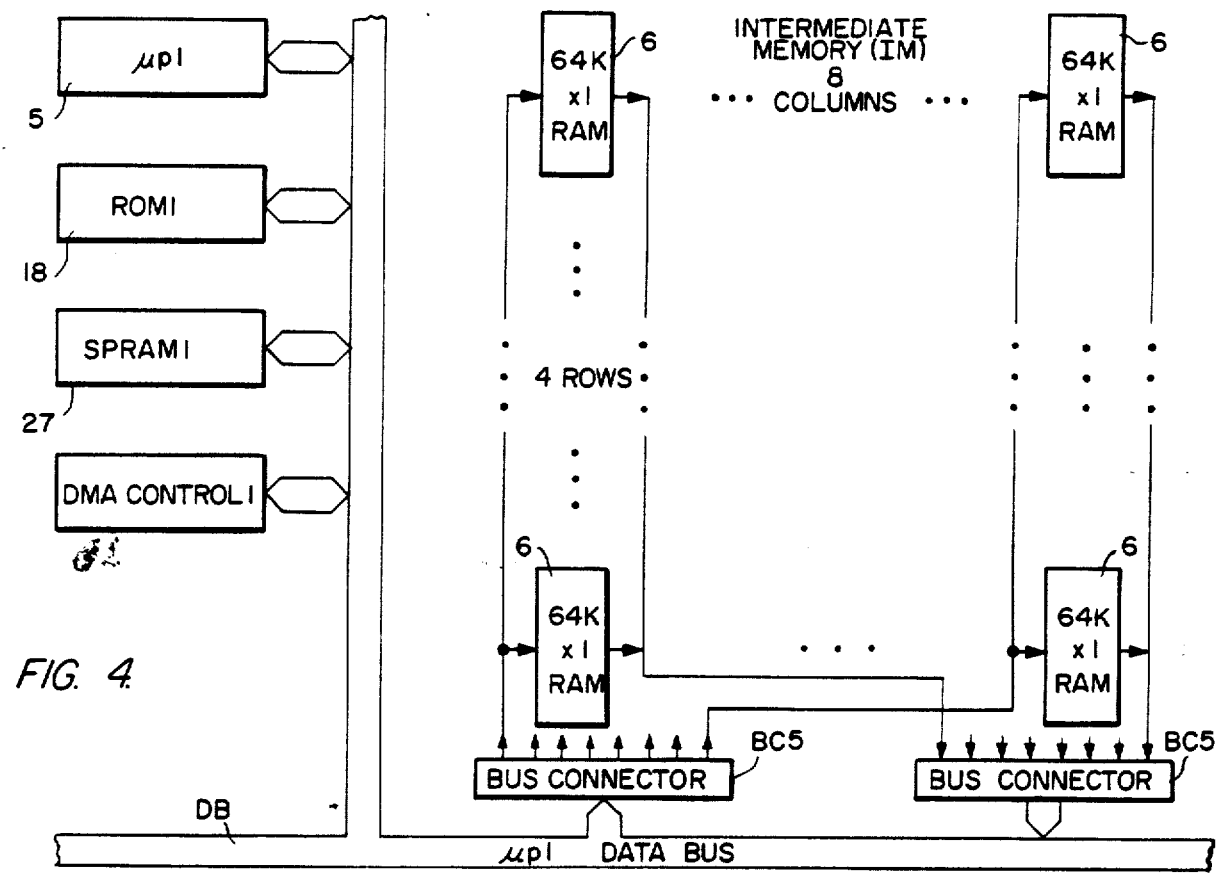
FIG. 4 is a similar detailed diagram of the processor and storage section of each of the line interface systems or boards.

FIG. 4 illustrates details of the microprocessor μp1 5, its associated read-only memory ROM1 18, a direct memory access controller DMA1, the scratchpad SPRAM1 27, and the intermediate random access memory 6 used for storage of 2.5 second segments of speech by each of the (up to) four line interface boards 12 in each system. Address, control, and some connecting circuitry are again omitted for clarity.

When the μp1 5 decides to transfer data from one of the eight channels on its board which is in operation in the record mode, FIG. 1, it first determines how many of the FIFO memories 3 used by the channel are filled. If only the bottom FIFO is filled (FIFO 4 in FIG. 3), μp1 5 transfers the contents to intermediate memory 6 by making 32 transfers through an internal register. If more than one of the FIFOs is filled, μp1 5 transfers the data using a faster method. It first sets up DMA1 to effect a direct memory access transfer, and then turns over the transfer to DMA1 for 64 or 96 transfers, corresponding to a filled condition of FIFOs numbers 3 and 4 or FIFOs 2, 3, and 4 (see FIG. 3). Since it takes longer to set up DMA1 than to transfer the data directly from one FIFO, this approach results in optimum speed of transfer.

The intermediate memory 6 is shown organized as an array of thirty-two 64k×1 RAMs. Each of the four rows of RAMs contains eight columns of RAMs, one for each bit in the eight bit words being transferred from the FIFOs. The memory is organized into 40 segments, each of 6k 8-bit words (2.5 seconds of conversation). The μp1 5 identifies an available segment of the intermediate memory in which to place each 2.5 second segment of conversation from the channel providing the input. When a 2.5 second segment of intermediate memory is filled, a new segment is identified and filled with the next 2.5 seconds of conversation. Bus connector BC5 is enabled to take data from μp1's data bus DB and place them into the appropriate RAMs as directed by the address signals from μp1 5 or from the DMA1 controller, whichever is responsible for the transfer.

When the channel being serviced is designated as a playback channel (FIG. 2), the μp1's task is to keep the FIFOs associated with this channel supplied with data from the message which is to be played back. Subsequent circuitry will keep at least one 6k segment of intermediate memory available for transfer to the FIFOs associated with the channel being serviced. If only one of the FIFOs (FIFO 1 of FIG. 3) is empty, transfer will be made through μp1 5. If more than one FIFO of FIG. 3 is empty, transfer will be made by DMA1, thereby optimizing speed of transfer as in the case of data recording. Bus connector BC5 is enabled to take data from μp1's data bus DB as supplied by the appropriately addressed RAMS and supply it to the FIFOs.

The system is fast enough to allow all eight input/output circuits to be served. That is, even if all channels are busy, and regardless of the combination of input/output channels, the FIFOs of any recording channel never fill up before data transfer occurs to clear them out to intermediate memory IM, and the FIFOs of any playback channel are never totally emptied before data is supplied to replenish them. This condition is fulfilled by the architecture described, together with the use of a microprocessor μp1 capable of rapid operation and programming which emphasizes processing speed (for instance using alternative direct or DMA transfer).

Figure 5:
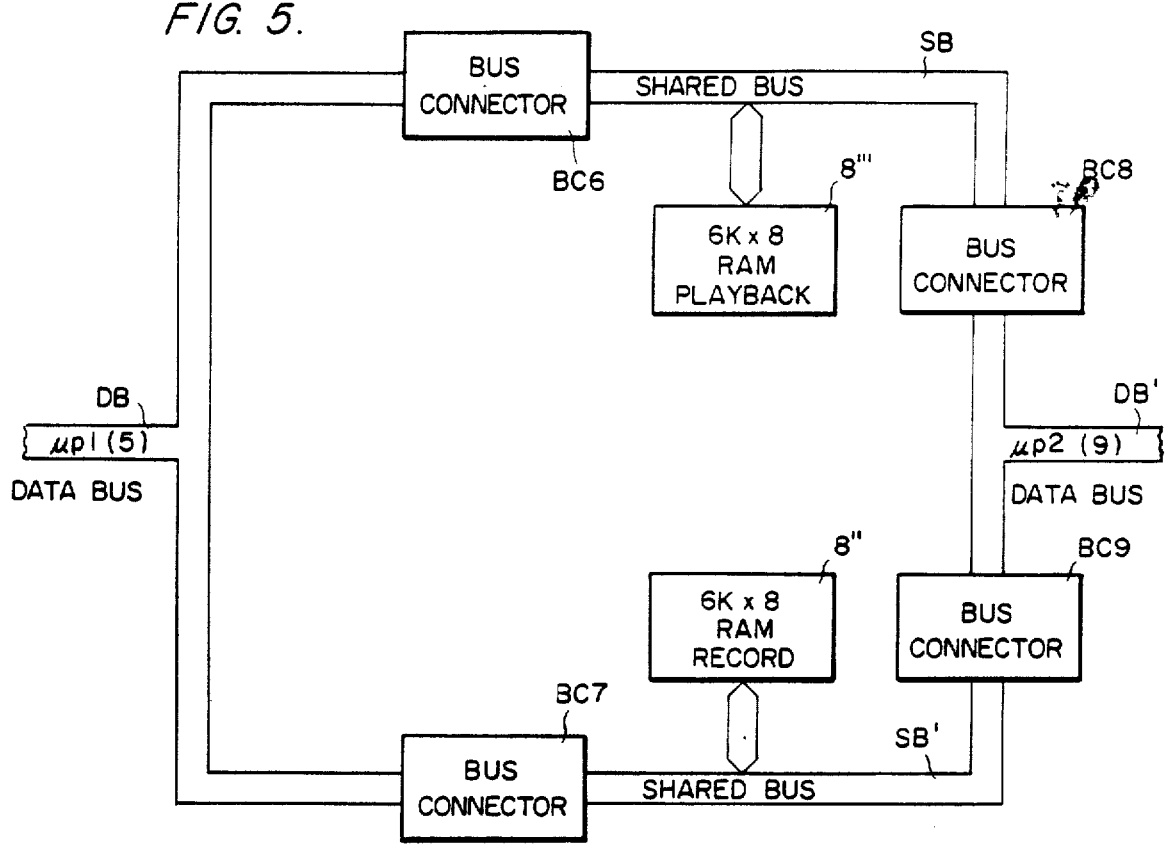
FIG. 5 illustrates circuit details for transferring of data between the line interface systems or circuit boards and the main processor board of FIGS. 1 and 2.

Details of how voice data may be transferred from each of the (up to) four line interface boards 12 to the main processor board 13 are illustrated in FIG. 5. The data transfer requires special means because the line interface boards are operating under control of their microprocesors μp1 5 and the main processor board is operating under control of its completely independent microprocessor μp2 9, FIG. 1. Each of the line interface boards is equipped wth two 6k×8 RAMs 8" and 8'". The first of the RAMs 8" is used to transfer data in 6k blocks (2.5 seconds of conversation) from one of the blocks of data in intermediate memory IM (FIG. 4) to the main memory MM on the main processor board (record mode, FIG. 1). The second of the RAMs 8'" is used to transfer data in 6k blocks from one of the blocks in the main memory MM to one of the available blocks in the intermediate memory IM of the apropriate line interface board (playback mode, FIG. 2).

Data transfer out to the main processor board 13 (record mode, FIG. 1) is initiated by μp1 5 which queues 6k blocks of data in IM for transfer. The μp1 5 takes the block at the head of the queue and using controller DMA1, FIG. 4, transfers the data to the RAM by placing it on its data bus DB. Bus connector BC7 is opened and bus connector BC9 is closed by μp1 5 to allow the shared data bus SB' to act as an extension of the data bus DB of μp1 5. At the same time, μp1 5 provides a signal to μp2 9 indicating that a block of data is ready for transfer (service request). When μp2 9 is ready to service the request, it makes shared bus SB' an extension of its data bus DB' by turning bus connector BC9 on, and bus connector BC7 off. The μp2 9 then effects a transfer using its DMA2 controller, now to be discussed in connection with FIG. 6.

Data transfer from the main processor board (playback mode, FIG. 2) is initiated by, μp2 9 on the main processor board. The transfer of 6k blocks to RAM 8' is performed by μp2 9 using its DMA2 controller, FIG. 6, and gaining access to the shared bus SB (FIG. 5) by turning bus connector BC8 on, and bus connector BC6 off. Once the transfer is complete, μup2 9 provides a signal to the appropriate μp1 5 and this μp1 transfers the contents of RAM 8' to an available block of 6k IM in its board, using its DMA1 controller, FIG. 4, and gaining access to the shared bus by turning bus connector BC8 off and bus connector BC6 on.

Figure 6:
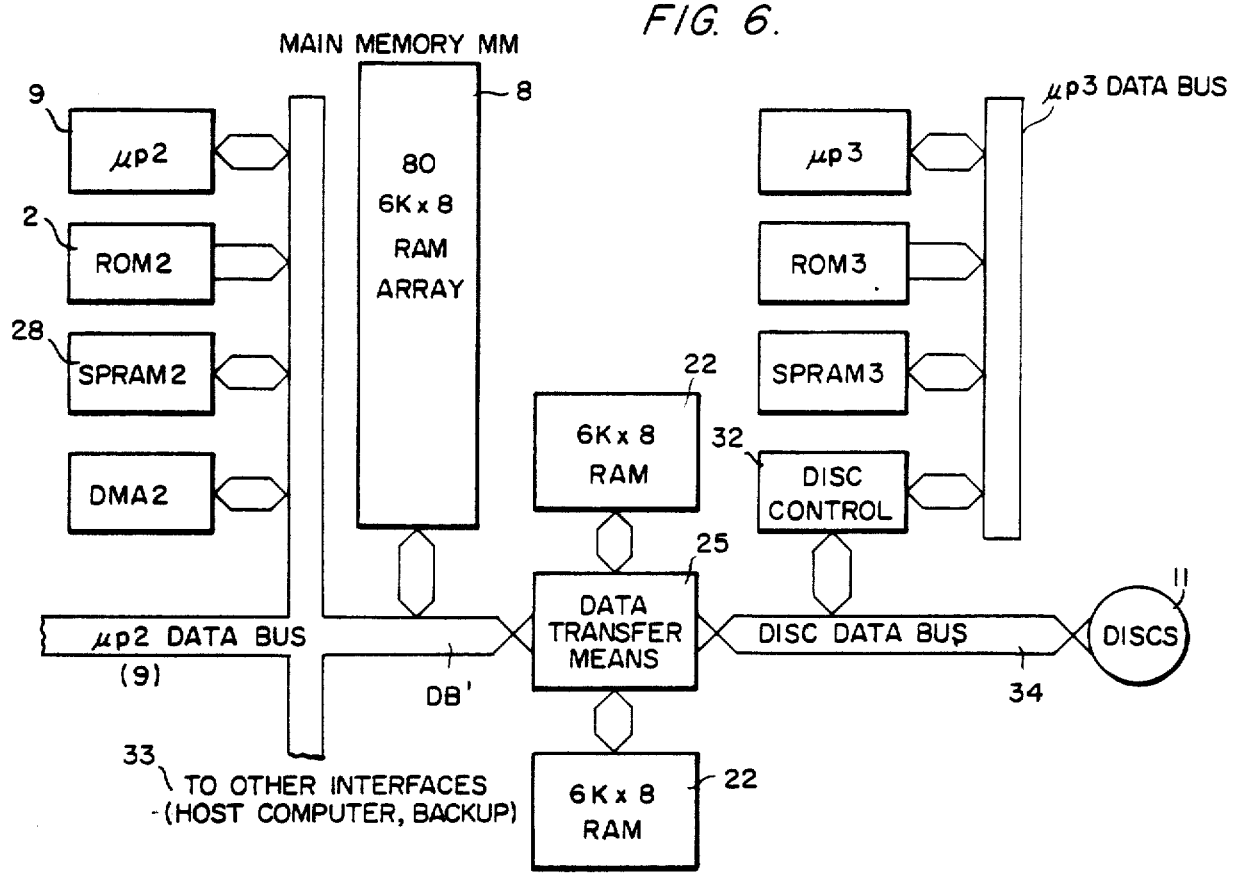
FIG. 6 is a diagram of the details of such main processor boards with address, control, and some circuitry omitted for clarity and to highlight the novel features of the invention.

FIG. 6 provides details of the main processor board 13 (13'). Once more, for clarity, address and control signals are deleted, as is some connecting circuitry. The μp2 9 under control of the program stored in ROM2 21 and SPRAM2 28 is responsible for collecting recorded data in 6k blocks from the line interface boards 12 and supplying playback data in 6k blocks to the line interface boards. The μup2 9 transfers data between the line interface boards and an array of eighty 6k×8 RAMs 8 using its DMA2 as shown in FIG. 6. RAM 8, the main memory MM, is organized eractly as the intermediate memory described in FIG. 4, except that it has eight rather than four rows of 64k×1 devices. The μp2 9 also has the task of transferring data—as usual in 6k blocks—between the main memory and the discs 11. Despite its size, the main memory can hold only 2.5×80=192 seconds or 3.2 minutes of conversation. Thus the task of storage must be passed on to the discs promptly to keep the main memory from filling up.

Using the shared bus approach described in connection with FIG. 5 above, and shown diagramically in FIG. 6 as data transfer means 25, data is either placed into or extracted from one of two 6k×8 RAMs 22 through μp2's data bus DB'. This data is removed and supplied to the disc system or is supplied from the disc system by a further microprocessor μp3 operating under control of the program stored in a ROM3 and SPRAM3. The special requirements of transferring data between one of the RAMs 22 and the discs is met by the use of disc control circuit 32 and high speed disc data bus 34 rather than the DMA devices associated with previously described data transfers. Circuit 32 represents a special version of circuits used to effect such transfers, however, in that it handles data in 6k blocks rather than the much shorter 256 byte blocks conventionally employed.

Finally, μp2 9 is concerned with communication for control and other purposes with the outside world, represented as "other interfaces"33. For this purpose, ports are provided allowing access to μp2's data bus DB' using the same method as described above with respect to transfer of data between main memory and the intermediate memories of the line processor boards. In particular, external signals are required to inform the system as to which message is to be retrieved, what channel it is to be delivered through, which channel is calling for service to record a message, and how the message is to be identified for later recall. Further it is desireable to back up the contents of the discs on a cassette or other large scale memory device.

Figure 7:
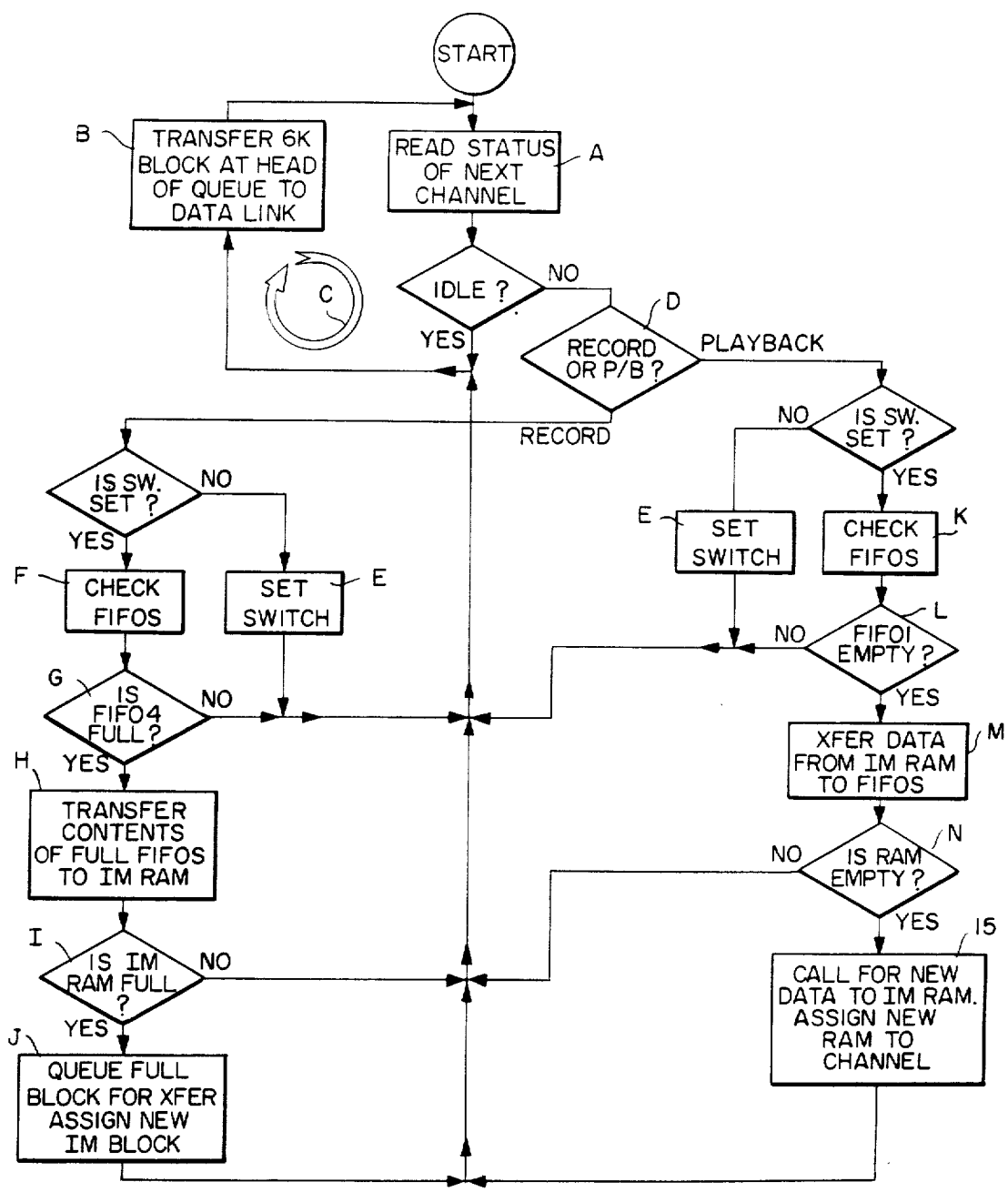
FIGS. 7 and 8 are simplified flow charts illustrating the programming operational steps employed by the microprocessors of each line interface board and main processor board, respectively.

A flow chart, simplified for clarity, of the program used to operate the μp1 on each of the line interface boards is presented in FIG. 7. The μp1 maintains a file of eight records in its scratchpad memory, each of which relates to the status of one of the eight input/output channels and, in the event the channel is not idle, the status of the message which the channel is either recording or playing back.

Initially, the μp1 reads the status of the first channel at A. If the channel is idle, μp1 proceeds, after completing the data transfer task indicated in block B later to examine the second channel. The μp1 continues to examine the status of each channel in order. In the event that all channels are idle, μp1 simply cycles through a status check of the channels over and over. The program returns to look at the first channel following a check of the eighth channel; and the idle cycle is shown by the arrow C.

When μp1 reads the status of a channel which is not idle, it determines from the status data whether the channel is to be used to record or play back. This information is initially provided by outside control through μp2 and remains fixed until the channel is returned to idle status, again by outside control relayed by μp2.

Once the channel is designated either as a record or playback channel D, μp1 sets the switch S (and other circuitry) shown in FIG. 3 for the appropriate service. The switch S is shown set at E upon the first cycle through this portion of the program and remains with this setting until the channel's status is changed. The next time μp1 cycles to the line under consideration, if the line is in the record mode, μp1 will examine the status of the FIFO memories at F, and determine if the last FIFO is filled, G. If it is not filled, μp1 returns to examine the status of the next line; if the last FIFO is filled, μp1 transfers the data in as many filled FIFO memories as exist at the time to the first available empty 6k block of IM. The transfer H is effected using either an internal register of μp1 or direct memory access, whichever is faster, as described above. This process continues in subsequent cycles until μp1 notes that the 6k IM block assigned to the channel is filled (at I). At that time, the filled 6k IM block is scheduled for transfer to the main procesor board and a new empty 6k IM block is assigned to the channel for further data transfers J.

Before examining the next channel for status A, μp1 will always check to see if there are any 6k IM blocks of data waiting for transfer at B. If there are (and if the data link to μp2 is available), the 6k IM block at the head of the queue will be placed into the link to await pickup by μp2.

When μp1 cycles to examine the status of a channel which is designated as a playback channel, μp1 examine the status of the FIFOs at K, once the switch S has been properly set at E. If the first FIFO is not empty, μp1 returns to examine the status to the next line. If the first FIFO, however, is empty, as at L, μp1 transfers data to fill as many empty FIFO memories as exist at that time from the 6k block of IM with the message data being played back (M). The transfer is effected using either an internal register of μp1 or direct memory access, whichever is faster, as before described. The process continues in subsequent cycles until μp1 notes that the 6k IM block assigned to the channel is empty, as at N. At this time, the next 6k IM block is assigned for further data transfer to the channel and a request for transfer of a new data block is put out to μp2. The μp1 keeps at least two blocks of 6k data available in IM for transfer to each channel in playback mode.

Unlike the scheduled transfer of data at B for channels in the record mode, μp1 is interrupted by μp2 whenever a block of playback data is placed in the data transfer link by μp2. The μp1 services the interrupt by transferring the data out of the link into the first available block of IM. Changes in the status records initiated by outside commands (begin recording, begin playback, and so forth) are relayed by μp2 by means of interrupts to μp1.

Figure 8:
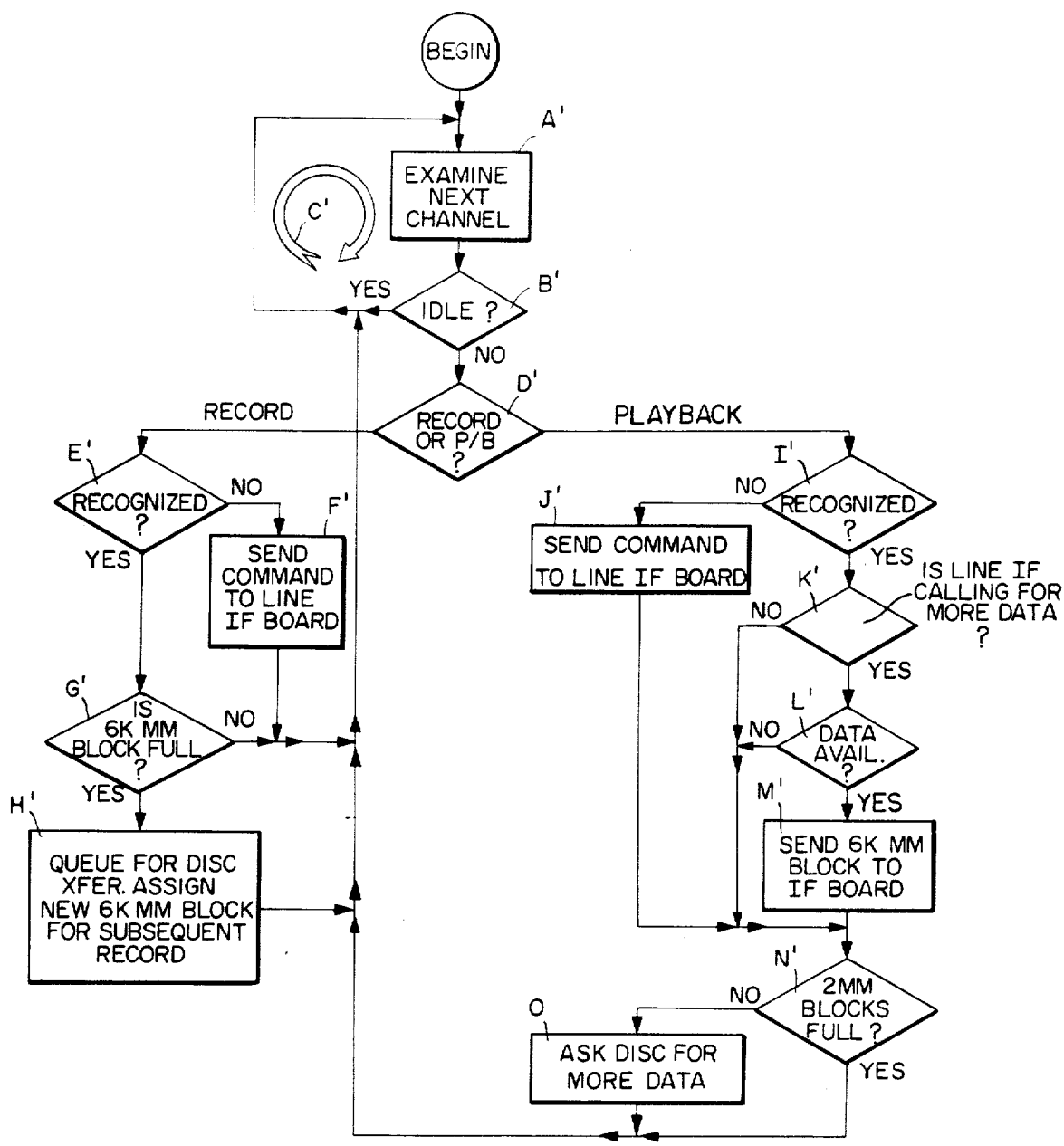

In FIG. 8, a similar flow chart is presented for the program which controls the main processor μp2 on the main processor boards 13. The μp2 maintains 32 records in the illustrative preferred embodiment illustrated and described herein, one for each input/output channel on the (up to) four line interface boards. The program starts by examining the status of the first channel on the first line interface board at A'. If it is idle (B'), the μp2 goes on to examine the second channel on the first line interface board, and so forth. When the system is configured with less than four line interface boards, the status indication for an unpopulated position informs μp2 of its absence and the program immediately proceeds to examine the status of the next channel. After examining the 32nd channel (the eighth channel of the fourth line interface board), the program returns to examine the status of the first channel of the first line interface board. If all channels are either idle or unpopulated, the program continues to cycle as shown by arrow C'.

Commands generated outside the system identify channels which are assigned to record a message and assign the message an identifying number; other commands identify a channel to be used to play back a message and identify the message to be played back by the number assigned to it when it was recorded. The commands are placed in the data link connecting μp2's data bus to a port on the main processor board. Such commands are accompanied by an interrupt to μp2 which then services the command by reading the contents into the appropriate record of the status table.

When the program first examines the status of a channel which has received a command, it first determines whether a record or playback status exists at D'.

If "record" is indicated, the program then determines whether it has recognized this status before or not, at E'. If not, the program puts the new status out to the appropriate μp1 by placing the data into the data link for the correct line interface board and issuing an interrupt to the appropriate μp1 as at F'. If the data link is not available at this point, the program skips to examine the next channel; and when it returns, it will again attempt to inform the appropriate μp1. If the program recognizes that it has successfully informed μp1 on a previous cycle, it determines whether a 6k block of data from the channel exists yet in the main memory, as at G'. If it does, it is queued for transfer to the discs at H' and a new block is assigned to the channel for subsequent recording. The program then returns to check the status of the next channel.

If "playback" is indicated, on the other hand, the program then determines whether it has recognized this status before or not at I'. If not, the program puts the new status out to the appropriate μp1 by placing the data into the data link for the correct line interface board and issuing an interrupt to the appropriate μp1 at step J'. If the data link is not available at this point, the program skips to examine the next channel; and when it returns, it will again attempt to inform the appropriate μp1. If the program recognizes that it has successfully informed μp1 on a previous cycle, it determines whether the channel is calling for more data. If so, and if a 6k MM block is full (steps K' and L'), the 6k block is sent out to the appropriate line interface board at M'. The program then asks if at least two blocks of 6k MM data remain awaiting transfer at N'. If not, the program requests a 6k block data from the discs at O'. The program then returns to examine the next channel's status.

Further modifications will occur to those skilled in this art, including other types of memory, data transfer and control techniques useable to practice the method of the invention, and also other types of communication serviceable by the same; and such are considered to fall within the spirit and scope of the invention as defined in the appended claims.

What is claimed is:

1. A method of recording digital data, that comprises providing successive segments of digital data, successively loading said segments into a first of a series of first-in-first-out (FIFO) memories and shifting the loaded data segments through the series of FIFO memories to a last FIFO memory of the series, and transferring data segments from the last FIFO memory to a further memory having sufficient capacity to store a plurality of said segments, the data transfer to the further memory being repeated frequently enough to ensure that the first FIFO memory is never full.

2. A method in accordance with claim 1, including the step of rippling each data segment loaded into the first FIFO memory to the last FIFO memory as soon as that data segment has been loaded into the first FIFO memory.

3. A method in accordance with claim 1, including the step of transferring data segments from the last FIFO memory to the further memory upon determination that the last FIFO memory is full.

4. method on accordance with claim 3, also including the step of transferring data segments from any full FIFO memories preceding the last FIFO memory upon determination that the last FIFO memory is full.

5. A method of playback of digital data segments stored in a memory, which comprises, successively transferring stored segments to a first of a series of first-in-first-out (FIFO) memories and shifting the transferred data segments through the series of FIFO memories to a last FIFO memory of the series, and unloading successive segments from the last FIFO memory and forming a data stream therefrom, the data transfer to the first FIFO memory being repeated frequently enough to prevent all of the FIFO memories from becoming empty once the transfer of data has begun and until all of a plurality of data segments have been transferred and unloaded.

6. A method in accordance with claim 5, including the step of transferring data segments to the first FIFO memory upon determination that the first FIFO memory is empty.

7. A method in accordance with claim 5, including the step of rippling each data segment loaded into the first FIFO memory to the last FIFO memory as soon as that data segment has been loaded into the first FIFO memory.

8. A method of providing simultaneous access by multiple users to a message recording and playback system and that employs a plurality of input/output channels 4-a each selectively operable in a recording mode or a playback mode, and each having a series of first-in-first-out (FIFO) memories, said method comprising, employing some of the channels in the recording mode and other of the channels in the playback mode; for each channel in the recording mode, loading successive segments of digital data into a first FIFO memory of that channel and rippling the loaded data segments through the FIFO memory series of that channel to a last FIFO memory thereof, determining, form time to time, whether the last FIFO memory is full, and if so, transferring the data segments therein and in any preceding full FIFO memories of the same series to an associated further memory, with the data transfer occurring frequently enough to prevent the first FIFO memory from becoming full; and for each channel in the playback mode, successively transferring segments of digital data from an associated further memory to a first FIFO memory of the series of FIFO memories of that channel and rippling the transferred data segments through the series to a last FIFO memory thereof and unloading the data segments from that last FIFO memory, with the data transfer from the further memory occurring frequently enough to prevent all of the FIFO memories of the series of that channel from becoming empty once data transfer from the further memory has begun and until all of a plurality of data segments have been transferred and unloaded, so that successive segments of data may be unloaded from the last FIFO memory of that channel without substantial gaps between them.

9. A method in accordance with claim 8, including the step of assigning the further memories to different channels dynamically as needed.

10. A method in accordance with claim 8, wherein the further memories constitute an intermediate memory and including the step of transferring between portions of the intermediate memory and portions of a main memory that are assigned for recording and playback dynamically, as needed, the direction of transfer between the intermediate and main memories depending upon whether the data transferred therebetween is being recorded or played back, and including the step of transferring data between portions of the main memory and portions of a disc memory, with the direction of data transfer between the main and disc memories depending upon whether the data transferred therebetween is being recorded or played back.

11. A method in accordance with claim 10, including the step of forming queues of data for data transfer between the intermediate and main memories.

12. A method in accordance with claim 11, including the step of controlling the data transfer by computer.

13. A method of digital communication between a plurality of input/output channels operable in a recording mode or a playback mode and a disc memory, that comprises providing for each channel a series of first-in-first-out (FIFO) memories to which data is supplied from an input during recording and from which data is supplied to an output during playback, providing an intermediate memory and a main memory that are shared by said channels, dynamically assigning different portions of said intermediate memory and said main memory to different input/output channels depending upon the need for recording data from input channels on said disc memory and the need for playing back data from said disc memory in output channels, transferring data between the FIFO memories of each channel and the intermediate memory portions assigned thereto, transferring data between portions of the intermediate memory and portions of the main memory assigned to the same channel, transferring data between portions of the main memory and the disc memory, with the directions of data transfer depending upon whether a channel and the portions of the intermediate memory and the main memory assigned thereto are in the recording mode or the playback mode, the data transfer from and to the FIFO memories of any channel during recording and playback, respectively, occurring often enough to prevent all the FIFO memories of any channel from being filled when data is being recorded in that channel and for preventing all of the FIFO memories of any channel from being empty when data is being played back in that channel.

14. A method in accordance with claim 13, including the step of repetitively determining whether each channel is in the recording mode or the playback mode, wherein, if it is determined that a channel is in the recording mode, including the step of further determining whether a last FIFO memory of the series of FIFO memories of that channel is full, and if so, transferring the data in all of the full FIFO memories of that channel to the intermediate memory, and if it is determined that a channel in is the playback mode, including the step of further determining whether a first FIFO memory of the series of FIFO memories of that channel is empty, and if so, transferring data from the intermediate memory to the FIFO memories of that channel.

15. Method in accordance with claim 14, wherein, if it is determined that a channel is in the recording mode, including the step of further determining whether an intermediate memeory portion assigned to that channel is full, and if so, transferring the data in the full intermediate memory portion to the main memory, and if it is determined that a channel is in the playback mode, including the step of further determining whether an intermediate memory portion assigned to that channel is empty, and if so, transferring data to the empty portion from the main memory.

16. Apparatus for providing multiple users with simultaneous message storage and retrieval, comprising, in combination, a plurality of channels operable in a recording mode or a playback mode, each channel having a series of first-in-first-out (FIFO) memories through which segments of digital data are shifted from a first FIFO memory of the series to a last FIFO memory of the series, each channel in the recording mode having means for loading successive segments of digital data into the first FIFO memory of that channel, having means for determining when the last FIFO memory thereof is full, and having means for transferring digital data segment from the full last FIFO memory to an associated further memory frequently enough to prevent the first FIFO memory from becoming full; each channel in the playback mode having means for transferring successive segments of digital data to the first FIFO memory of that channel from an associated further memory and having means for unloading digital data segments from the last FIFO memory of that channel and forming a digital data stream therefrom, with the data transfer to the first FIFO memory of that channel being frequent enough to prevent the first FIFO memory of that channel from becoming empty once data transfer thereto has commenced and until all of a plurality of data segments have been unloaded, whereby successive segments of digital data may be unloaded from the last FIFO memory of that channel without substantial gaps therebetween.

17. Apparatus in accordance with claim 16, wherein the further memories constitute an intermediate memory and wherein said apparatus also comprises a main memory and a disc memory, means for transferring data between the intermediate memory and the main memory, and means for transferring data between the main memory and the disc memory.

18. Apparatus in accordance with claim 17, further comprising means for forming queues of data for data transfer between the intermediate memory and the main memory.

19. Apparatus in accordance with claim 16, wherein, the data transfer means that transfers data from the last full FIFO memory of any channel in the recording mode also transfers data from any preceding FIFO memories of that channel that are full.

20. Apparatus in accordance with claim 16, wherein the data transfer means that transfers data to the first FIFO memory of any channel in the playback mode transfers data thereto upon determination that the first FIFO memory thereof is empty.

21. Apparatus in accordance with claim 16, wherein each channel has analog-to-digital and digital-to-analog converter means for converting data loaded into or unloaded from the FIFO memories of that channel.

22. Apparatus in accordance with claim 16, wherein the further memory associated with each channel in the playback mode has means for transferring data segments thereto frequently enough to insure that data segments are available for transfer to the first FIFO memory of that channel substantially continuously once the data transfer has begun.

23. Apparatus in accordance with claim 16, wherein the channels, the FIFO memories, the associated further memories, and the data transfer means are controlled by a first microprocessor, said apparatus further comprising a main memory, a disc memory, second data transfer means for transferring data between the further memories and the main memory, and third data transfer means for transferring data between the main memory and the disc memory, said second and third data transfer means being controlled by a second microprocessor.

* * * * *